US012258126B2

(12) United States Patent
Kurz et al.

(10) Patent No.: US 12,258,126 B2
(45) Date of Patent: Mar. 25, 2025

(54) MONUMENT FOR AN AIRCRAFT CABIN, AND AIRCRAFT COMPRISING A MONUMENT OF SAID TYPE

(71) Applicant: LUFTHANSA TECHNIK AG, Hamburg (DE)

(72) Inventors: Christian Kurz, Freising (DE); Thorben Wienholtz, Hamburg (DE)

(73) Assignee: LUFTHANSA TECHNIK AG, Hamburg (DE)

( * ) Notice: Subject to any disclaimer, the term of this patent is extended or adjusted under 35 U.S.C. 154(b) by 599 days.

(21) Appl. No.: 16/499,718

(22) PCT Filed: Mar. 29, 2018

(86) PCT No.: PCT/EP2018/058136
§ 371 (c)(1),
(2) Date: Sep. 30, 2019

(87) PCT Pub. No.: WO2018/184995
PCT Pub. Date: Oct. 11, 2018

(65) Prior Publication Data
US 2020/0047889 A1    Feb. 13, 2020

(30) Foreign Application Priority Data
Apr. 3, 2017 (DE) ............ 10 2017 205 637.1

(51) Int. Cl.
*B64D 11/00* (2006.01)
*B64D 11/02* (2006.01)
(Continued)

(52) U.S. Cl.
CPC .......... *B64D 11/0015* (2013.01); *B64D 11/04* (2013.01); *B64D 11/0691* (2014.12);
(Continued)

(58) Field of Classification Search
CPC .. B64D 11/0015; B64D 11/0691; B64D 11/02
See application file for complete search history.

(56) References Cited

U.S. PATENT DOCUMENTS 4,112,818 A * 9/1978 Garehime, Jr. .... B64D 45/0042
  109/9
5,322,244 A * 6/1994 Dallmann .......... B64D 11/0007
  244/118.1
(Continued)

FOREIGN PATENT DOCUMENTS

DE      102010013330 A1 * 10/2011 ............ A47B 31/06
DE    10 2011 011 704 A1   12/2012
(Continued)

OTHER PUBLICATIONS

Aviation Explorer, Sep. 25, 2016, [web.archive.org/web/201690925095432/http:www.aviationexplorer.com/jet_airways_airlines_aircraft_seating_maps.html] (Year: 2016).*
(Continued)

*Primary Examiner* — Tye William Abell
*Assistant Examiner* — Justin Michael Heston
(74) *Attorney, Agent, or Firm* — SALIWANCHIK, LLOYD & EISENSCHENK

(57) ABSTRACT

Embodiments related to a monument for an aircraft cabin. On the monument, a screen is provided for displaying the images captured by a video surveillance device.

18 Claims, 2 Drawing Sheets

Figure 1:
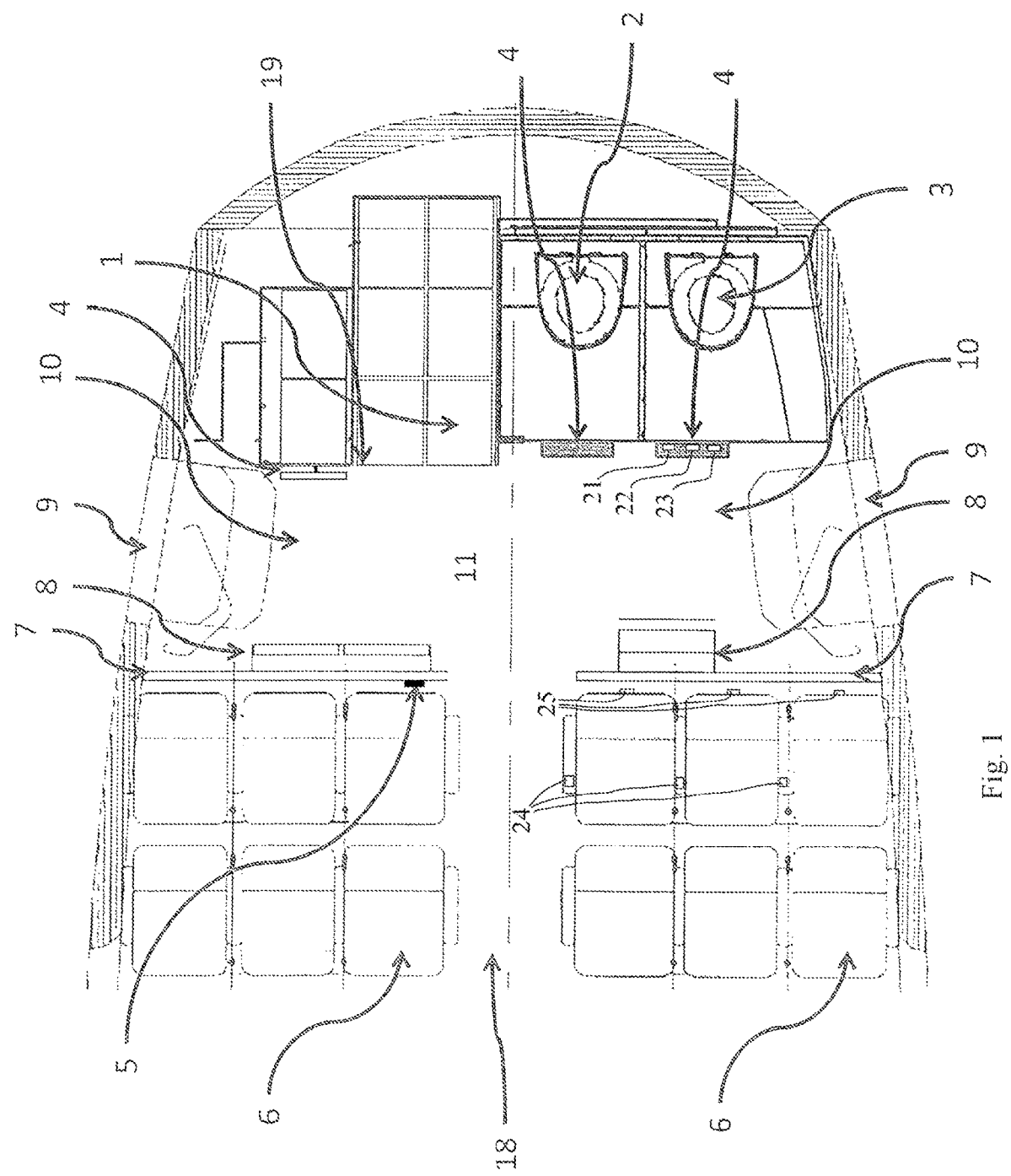

(51) Int. Cl.
   *B64D 11/04*   (2006.01)
   *B64D 11/06*   (2006.01)
   *G06Q 50/12*   (2012.01)
   *G06Q 50/40*   (2024.01)
(52) U.S. Cl.
   CPC ............. *G06Q 50/12* (2013.01); *G06Q 50/40* (2024.01); *B64D 2011/0046* (2013.01); *B64D 11/02* (2013.01)

(56) References Cited

U.S. PATENT DOCUMENTS

| | | | |
|---|---|---|---|
| 5,808,661 | A | 9/1998 | Infiesto et al. |
| 6,087,927 | A | 7/2000 | Battistini et al. |
| 6,864,805 | B1 | 3/2005 | Gomez |
| 7,792,189 | B2 * | 9/2010 | Finizio ............... B64D 45/0053 348/148 |
| 9,079,668 | B2 * | 7/2015 | Gee ..................... B64D 11/02 |
| 9,376,211 | B2 | 6/2016 | Schliwa et al. |
| 9,403,603 | B2 | 8/2016 | Hozumi et al. |
| 9,643,724 | B2 * | 5/2017 | Brunaux ............... B64D 11/02 |
| 10,572,933 | B2 | 2/2020 | Verweij |
| 2003/0057323 | A1 | 3/2003 | Keogh |
| 2003/0200546 | A1 | 10/2003 | Keen et al. |
| 2006/0238375 | A1 | 10/2006 | Gomez et al. |
| 2008/0116318 | A1 * | 5/2008 | Wesley ............... F16M 11/2085 361/679.05 |
| 2008/0136299 | A1 | 6/2008 | Peurifoy |
| 2010/0218225 | A1 * | 8/2010 | Wilcynski ............ B64D 11/064 725/76 |
| 2011/0273849 | A1 | 11/2011 | Jaeger |
| 2012/0025018 | A1 | 2/2012 | France et al. |
| 2013/0001359 | A1 | 1/2013 | Schliwa et al. |
| 2013/0160061 | A1 | 6/2013 | Koch et al. |
| 2013/0187000 | A1 | 7/2013 | Godecker et al. |
| 2013/0248652 | A1 | 9/2013 | Godecker et al. |
| 2014/0125092 | A1 * | 5/2014 | Schreuder ............. B64D 11/00 29/401.1 |
| 2015/0070492 | A1 * | 3/2015 | Hozumi ................. B64D 47/08 348/143 |
| 2015/0322656 | A1 * | 11/2015 | Huang ..................... E03D 9/14 4/209 R |
| 2016/0304204 | A1 * | 10/2016 | McKee ................ B64D 11/003 |
| 2017/0021929 | A1 * | 1/2017 | Mckee ............... B64D 11/0691 |
| 2017/0316664 | A1 | 11/2017 | Gerard |

FOREIGN PATENT DOCUMENTS

| | | | | |
|---|---|---|---|---|
| DE | 20 2011 110 232 U1 | 4/2013 | | |
| NL | 2013635 B1 | 10/2016 | | |
| WO | WO-2005014395 A1 * | 2/2005 | ............. | B64D 11/02 |
| WO | WO 2008/066722 A2 | 6/2008 | | |
| WO | WO-2010120811 A2 * | 10/2010 | ............. | B64D 11/00 |
| WO | WO 2015/028810 A1 | 3/2015 | | |
| WO | WO-2015155379 A1 * | 10/2015 | ............. | B64D 11/00 |
| WO | WO 2015/171718 A1 | 11/2015 | | |
| WO | WO-2016067168 A1 * | 5/2016 | ......... | B64D 45/0015 |

OTHER PUBLICATIONS

1$^{st}$ Examination Report issued by the German Patent and Trademark Office dated Jan. 31, 2018 with respect to priority German Patent Application No. 10 2017 205 637.1.

Notification for an opposition procedure issued by the European Patent and Trademark Office dated Jun. 23, 2022 with respect to priority European Patent Application No. 3 606 818.

A340 Cabin Crew Operating Manual UAE 340-500 Fleet, Cover Sheet, 2002.

A340 Cabin Crew Operating Manual UAE 340-500 Fleet, Table of Contents (2004): pp. 1-26.

A340 Cabin Crew Operating Manual UAE 340-500 Fleet, Cabin Crew Stations (2004) 02.050: pp. 1-11,.

A340 Cabin Crew Operating Manual UAE 340-500 Fleet, Cabin Layout (2004) 02.030: pp. 1-4.

A340 Aircraft Maintenance Manual, Cabin Monitoring—Description and Operation (2004): pp. 1-9.

Document of sale and delivery of aircraft type A340-541 with No. MSN 0457 (2003).

Lufthansa Technik, "High-Denisty solution for Airbus A320 family." (2003): pp. 1-2.

Flight Review, "Lufthansa Technik and Diehl Aerosystems: Compact Toilets/Kitchen unit for A320-Family" (2017): pp. 1-3.

Gavine, A., "A320 monument claimed to save weight and add seats" (2017): pp. 1-3.

O'Keeffe, N., "LHT set to present new weight-saving A320 cabin monument" (2017): pp. 1-2.

"A380 Cvms Cabin Video Monitoring System", Parker Aerospace, (2005): pp. 1-2.

* cited by examiner

MONUMENT FOR AN AIRCRAFT CABIN, AND AIRCRAFT COMPRISING A MONUMENT OF SAID TYPE

CROSS REFERENCE TO RELATED APPLICATIONS

This application is a National Stage Application of International Application Number PCT/EP2018/058136, filed Mar. 29, 2018; which claims priority to German Patent Application No. 10 2017 205 637.1, filed Apr. 3, 2017.

The present invention relates to a monument for an aircraft cabin, and to an aircraft comprising a monument of this kind.

Monuments for aircraft cabins within the meaning of the invention are large, prefabricated modules which are specially adapted to the available installation space in the aircraft cabin. As essential components, monuments may comprise aircraft kitchen modules and sanitary modules, such as toilet modules.

The aircraft kitchen module comprises the subunits required in a kitchen for storing and preparing food and drinks and is mounted in the aircraft cabin as a preassembled module. The subunits in the aircraft kitchen module may for example be integrated, thermally insulated refrigeration or heat retention devices, coffee machines, rinsing and washing devices, or the like. Moreover, aircraft kitchen modules of this kind may further comprise one or more of the following additional modules: communications modules, control modules, and the like. The aircraft kitchen modules are also referred to as a "galley" and comprise a structure having standardised slide-in compartments in which various modules having different functions can be received. As a result, the aircraft kitchen module can be individually adapted for the aircraft, without the basic structure thereof being changed.

In the case of aircraft comprising an aircraft cabin having just one aisle and two groups of seats arranged to the sides thereof (known as "single aisle" aircraft), the monument is generally arranged in a rear portion of the aircraft cabin, such that the cabin crew can survey the aircraft cabin entirely, in the direction of flight, proceeding from the monument. Within the meaning of the application, "cabin crew" is of course intended to mean both female and male cabin crew in the aircraft cabin.

In principle, during the take-off and landing phases both the passengers and the cabin crew must sit in their seats in an upright position and be secured therein by suitable restraining devices, such as safety belt devices. According to a further requirement of the aviation regulations (EASA CS 25.0785), it is in addition necessary to ensure that at least one member of the cabin crew has the passengers in view during the take-off and landing phase. In order to meet this requirement a seat (Cabin Attendant Seat—CAS) is provided for a member of cabin crew, which seat is arranged such that the cabin crew member sitting therein has a free view of the passengers during the take-off and landing phases. When a monument, comprising the above-described modules, is arranged in the rear region of the aircraft cabin of an aircraft of the "single aisle" type, said seat is preferably arranged centrally on the monument and so as to be flush with the aisle of the aircraft cabin, and in this case oriented such that the cabin crew member sitting therein looks forwards, down the aisle, in the direction of flight, and thus has the passengers sitting to the sides of the aisle in view.

A disadvantage of this solution is that, owing to the arrangement provided therefor, the seat to be provided for the cabin crew restricts the design freedom for the aircraft cabin, with the result that it is not possible to make optimal use of the available interior space in the aircraft cabin for arranging aircraft seats for passengers. In an extreme case, this can lead to the maximum number of aircraft seats in the aircraft cabin being reduced as a result, although the interior space conditions of the aircraft cabin would actually allow for arrangement of a larger number of aircraft seats. Furthermore, the weight of the monument is increased by the aircraft seat that is to be provided thereon. All aircraft seats have to be fixed such that said seats, together with a person sitting therein, are securely fixed even at accelerations of up to 16 g, and therefore the fixing of the aircraft seat to the monument must furthermore be correspondingly secure, and the monument must be correspondingly dimensionally stable in the region of the fixing. This, too, leads to a disadvantageous increase in weight of the monument.

WO 2015/155379 A1 already discloses monitoring the aircraft cabin using a camera, and reproducing the image recorded by the camera using a playback device, such as a monitor, in order that the cabin crew can also have the passengers in view from another location of the aircraft cabin, by looking at the monitor. The monitoring of the passengers is then performed via the monitor and not by way of direct visual contact.

Against this background, the object of the invention is that of providing a solution by means of which it is possible to further improve the design freedom in the layout of the aircraft cabin, in a manner associated with the lowest possible additional costs and installation outlay.

According to the invention, in order to achieve the object, a monument having the features of claim 1 and an aircraft comprising a monument of this kind and having the features of claims 12 to 15 are proposed.

According to the basic concept of the invention, in order to achieve the object a monument is proposed, on which a monitor for reproducing the images recorded by a video surveillance device is provided.

The proposed solution has a plurality of advantages. The most important advantage should be considered to be the fact that the monitor on the monument, provided for observing the passengers, makes it possible to observe the passengers in the aircraft cabin on the monument, without the passengers being directly in the field of vision of the cabin crew. In this case, the monitor can in particular be arranged on the monument, irrespective of the arrangement of the monument and the field of vision, such that the cabin crew can comfortably observe the passengers on the monitor, during the take-off and landing phases. As a result, the seat (CAS) for the cabin crew, previously provided on the monument especially for observing the passengers, can be omitted, and the overall aircraft kitchen module can be designed in a more compact and lightweight manner. Furthermore, the monitor is preassembled and mounted in the aircraft as a module, together with the monument. As a result, the monitor can be provided in the aircraft during assembly of the aircraft, without additional effort. The selection of the monument for arranging the monitor is furthermore advantageous because the monument is the location that the cabin crew visit regularly and very frequently, and therefore the likelihood that at least one cabin crew member can view the monitor is greatest here. Furthermore, the cabin crew can observe the passengers even when occupied with other tasks, such as preparing for service. Furthermore, in particular in the case of "single aisle" aircraft, the exits and in particular the emergency exits, which are intentionally wider and can therefore preferably be used for arranging the seats for the cabin crew, are arranged in the region of or close to the monument, from which seats the cabin crew can then particularly easily observe the monitor provided on the monument.

It is furthermore proposed for the monitor to be arranged transversely to the direction of flight, when in a use position, such that the cabin crew can observe the monitor ergonomically and without turning their heads when in an upright posture and in a seat direction oriented in the direction of flight or counter to the direction of flight.

Furthermore, an aircraft seat arranged opposite the monitor can preferably be provided on the monument, such that the monitor and the aircraft seat are in a fixed spatial relation to one another, owing to being arranged on the same module. Furthermore, the assembly time in the aircraft can be reduced as a result.

Furthermore, the monitor can preferably be pivotably retained on the monument, such that the person viewing the monitor can orient the display for improved visibility, which is advantageous in particular in the case of sunlight shining in obliquely, and associated reflections.

Moreover, a storage compartment for receiving the monitor can be provided on the monument, such that the monitor can be stored accordingly in the storage compartment, in a non-use position, when not in use. As a result, in the non-use position the monitor can be protected from outside mechanical influences, and is not in the way, in a disruptive manner, when not in use. A closable or open compartment can be used as the storage compartment, into which the monitor can be inserted or pivoted. Alternatively, the storage compartment can, however, also be a depression in the form of a bulge which is sufficiently deep that the monitor does not protrude beyond the outer surface of the aircraft kitchen module when arranged in the depression. In this case, the monitor can also be fixedly arranged on the monument, and the depression or bulge can also additionally serve as sun protection for the monitor, during use of the monitor, as a result of which the readability of the monitor can be improved.

Furthermore, the monitor can preferably comprise one or more optical input and output units 21 and/or one or more acoustic input and output units 22 and/or one or more haptic input units 23. The monitor can thus be used not only for monitoring and viewing the images of the video surveillance device, but rather in addition also for inputting data and for allowing the cabin crew to communicate with the passengers, it being possible for both optical signals and acoustic signals to be input and output. Furthermore, haptic input via touch-sensitive controls on the monitor may also be possible.

Moreover, the monitor can also be designed for reproducing the image of the viewer. This can be achieved by providing a camera on the monitor, which camera is directed to the viewer of the monitor, and the recorded image of which can be displayed on the monitor. Alternatively, the reflective function of the monitor can also be achieved by covering the monitor by a mirror, or by switching monitor itself into a reflective mode. As a result, the cabin crew can use the monitor itself as a visual check and for adjusting their external appearance before discharging their service duties in the aircraft cabin.

It is furthermore proposed that the video surveillance device and the monitor should together form a stand-alone system that is independent of further devices. This is advantageous in that it is possible to retrofit aircraft that are already in operation. Cabin management systems already in use already make it possible, today, to call up various functions via a monitor, but said systems are not based on modern server solutions, but rather on technologies from the time that the aircraft model was first registered. Moreover, said systems have to fulfil far higher aviation requirements. As a result, said systems can be expanded only to a limited extent, and therefore the proposed solution of a stand-alone embodiment of the video surveillance device and the monitor interacting therewith can also be used, as a particularly expedient retrofit solution, even in aircraft of an older design.

It is furthermore proposed that the monitor should have a resolution of at least 1280×720 pixels, preferably 1920×1080 pixels. The monitor can thus be used for very good observation of the passengers, the proposed resolution also allowing for smaller movements by the passengers and small details in the aircraft cabin to be observed very effectively. For example, in aircraft known as the "single aisle" type, the cabin crew must be able to observe up to 200 passengers in the aircraft cabin, which is made possible by the high resolution.

It is furthermore proposed that the monitor should have a screen diagonal of at least 13 inches, with the result that the image reproduced by the monitor allows for observation of the passengers when the cabin crew are sitting at a distance of 0.8 to 1.5 metres away from the monitor.

It is furthermore proposed that the monument should comprise an aircraft kitchen module, and that the monitor should be arranged on the aircraft kitchen module. The aircraft kitchen module is the module at which the cabin crew primarily perform the actions for preparing for service, and therefore they can observe the monitor particularly effectively during these actions too.

Alternatively or in addition, it is proposed that the monument should comprise at least one sanitary module, and that the monitor should be arranged on the sanitary module. If an additional monitor is provided on the sanitary module, the observation can also be performed via said additional monitor. If the video surveillance device comprises two cameras that are each directed to one group of the aircraft seats of the aircraft cabin, respectively, it is then possible to observe different groups of aircraft seats or a smaller number of aircraft seats, but in a larger size, on the monitor.

Furthermore, the aircraft may comprise an order system that provides for an order process personalised to the aircraft seat, the monitor being designed for reproducing the order process personalised to the aircraft seat. In this case, the order system can comprise one order input device 24 on each aircraft seat, or one order input device 24 on a row of aircraft seats in each case, via which order input device 24 the passenger can input the order into the order system. The passenger can then submit an order associated with the aircraft seat, in the order system, which order is then displayed on the monitor provided on the aircraft kitchen module. As a result, it is possible to significantly reduce the complexity of the service for the cabin crew. This is advantageous in particular because the order can thus already be placed during the vertical flight phases, during which the cabin crew must be in their seats. As a result, the process of taking orders, required thus far, is omitted, and the cabin crew can then begin to process the orders immediately following the end of the vertical flight phase, with the result that the cabin crew has more time, overall, for processing the orders, which is advantageous in particular in the case of short-haul flights.

It is furthermore proposed that the aircraft should comprise a communication device 25 personalised to the aircraft seat, and the monitor should be designed for reproducing the signals transmitted by the communications device 25. As a result, the cabin crew and the passengers can communicate with one another via the communications device 25 and the monitor in the aircraft kitchen module, and therefore the cabin crew can more directly clarify, with the passengers, questions arising during preparation of the food or drinks, without the cabin crew having to find the passenger again for this purpose. Moreover, the cabin crew can also monitor the passengers in this manner, which may be advantageous, in particular, in the case of people who are unwell or in the case of infants.

It is furthermore proposed that an aircraft seat arranged so as to be opposite the monitor, in the assembled position, should be provided in the aircraft. The aircraft seat is arranged opposite the monitor, and the position of the aircraft seat is virtually specified by the arrangement of the monitor, or vice versa. The monitor is thus located in the field of vision of the cabin crew member sitting in the aircraft seat. Since the aircraft kitchen module, as has already been described above, is preferably arranged at the exit or emergency exit, having an exit that is to be kept free, the aircraft seat for observing the monitor can preferably be provided in the region of the widened exit, it being possible for the aircraft seat to have a folding function, so that it can be folded up, when not in use, to free the exit.

Figure 2:
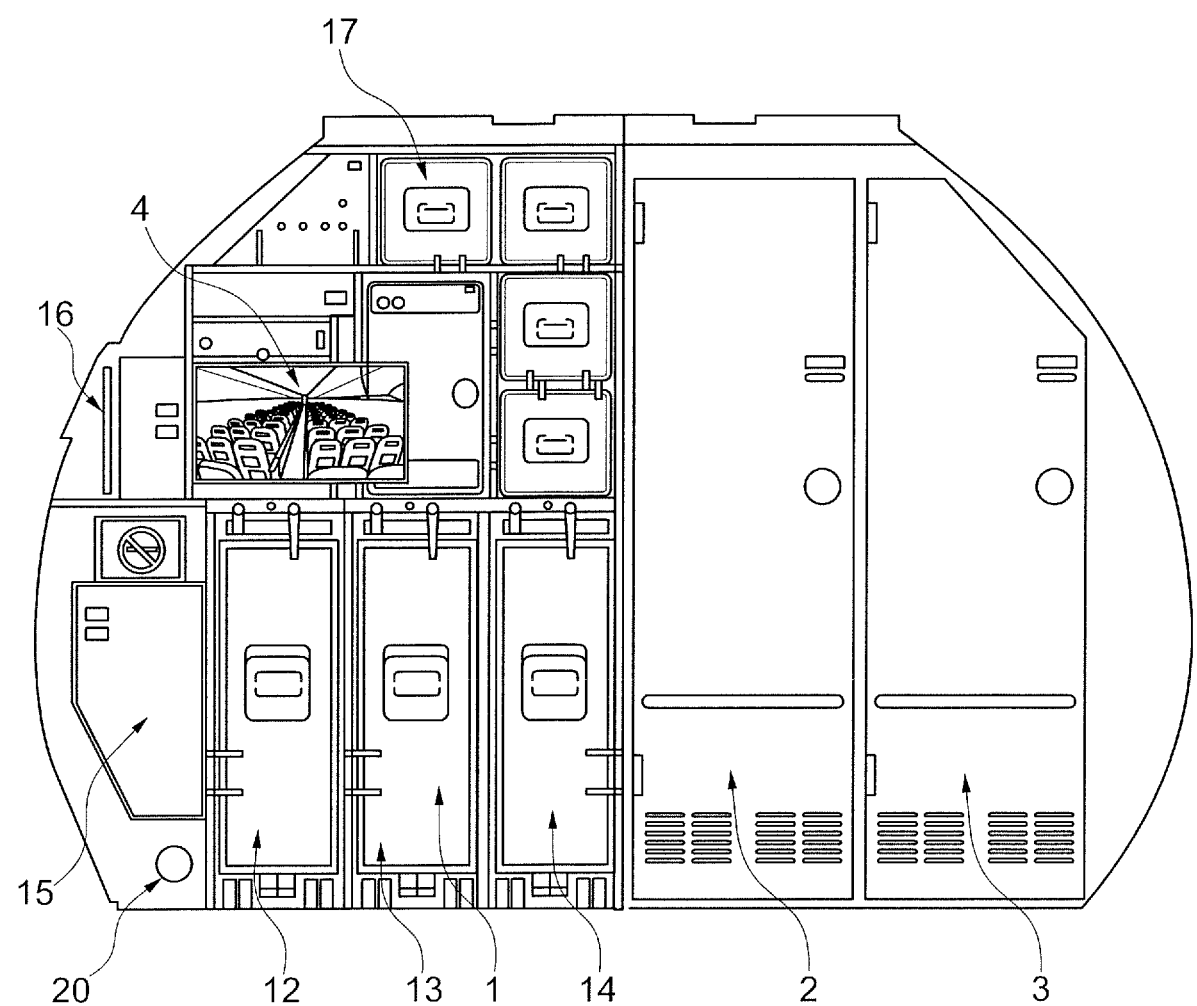

The invention will be explained in the following on the basis of preferred embodiments and with reference to the accompanying drawings. In the drawings:

FIG. 1 is a cross section, from above, of an aircraft cabin comprising an aircraft kitchen module; and FIG. 2 is a view of the aircraft kitchen module from the front.

FIG. 1 shows a detail of a rear end of an aircraft cabin 11. The aircraft is an aircraft type denoted "single aisle", comprising a central aisle 18 and two groups of first aircraft seats 6 arranged to the sides thereof. In the rear portion of the aircraft cabin 11, a monument comprising an aircraft kitchen module 1 and two sanitary modules 2 and 3 is provided, which monument is mounted in the aircraft cabin 11 in a preassembled form, as a unit.

The two groups of first aircraft seats 6 are delimited by two partitions 7, at the end facing the monument, such that, with the exception of the central aisle 18, the passengers sitting on the first aircraft seats 6 are visually and acoustically separated from the monument. Two exits 10 that branch off to the sides from the central aisle 18 and that comprise an exit door 9 in each case are provided between the partitions 7 and the monument, which exits can be designed as a normal exit or as an emergency exit.

Two second aircraft seats 8 are provided on the partitions 7, on each of which seats a cabin crew member can sit during the take-off and landing phase of the aircraft. The second aircraft seats 8 are the Cabin Attendant Seats (CAS) described at the outset. The second aircraft seats 8 are foldable and can therefore be folded up into a position that frees the exits 10. Furthermore, a camera of a video surveillance device 5, which camera is directed towards the first aircraft seats 6, is provided on one of the partitions 7. In order for the camera to record as far as possible all the passengers of the aircraft cabin 11, said camera is arranged in an upper portion of one of the partitions 7, close to the central aisle 18, and oriented forwards, into the aircraft cabin 11, in the direction of flight, so as to be at as shallow an angle as possible. Alternatively, the camera of the video surveillance device 5 can also be arranged in a front portion of the aircraft cabin 11 and be directed to the first aircraft seats 6, from the front. Furthermore, the video surveillance device 5 can also comprise a plurality of cameras directed to different groups of the first aircraft seats 6.

A monitor 4 oriented transversely to the direction of flight is provided on a front wall 19 on the aircraft kitchen module 1, which monitor is arranged in an upper portion of the aircraft kitchen module 1 and so as to be at the eye height of the cabin crew member sitting opposite, on the second aircraft seat 8, as can also be seen in FIG. 2.

The aircraft kitchen module 1 comprises a plurality of standardised slide-in compartments of different sizes and shapes. In a lower portion of the aircraft kitchen module 1, a double-width slide-in compartment comprising two trolleys 13 and 14 arranged therein is provided on the right-hand side, the left-hand side of which compartment is adjoined by a single-width slide-in compartment comprising just one trolley 12. The double-width slide-in compartment is of a depth that corresponds to the depth of three "half-size trolleys", meaning that three half-size trolleys or one full-size trolley and one half-size trolley can be inserted therein. In contrast, the single-width slide-in compartment is only the depth of two half-size trolleys or the depth of one full-size trolley, meaning that, accordingly, two half-size trolleys or one full-size trolley can be inserted therein. The trolleys 12, 13 and 14 are used for storing food and drinks and are pre-packed by catering firms located at the airport. Furthermore, a compartment comprising a rubbish bin 15 is provided on the left-hand lower portion of the aircraft kitchen module 1, below which rubbish bin a shut-off valve 20 is furthermore provided, by means of which valve the entire monument can be separated from a central compressed air supply of the aircraft.

In an upper portion of the aircraft kitchen module 1, a plurality of smaller slide-in compartments having corresponding slots 17 is provided, in which compartments for example a coffee machine, crockery, cutlery, ice cubes or also simply additional packaging for the food and drinks stored in the trolleys 12, 13 and 14 can be received. The division of the upper slide-in compartments is slightly set back with respect to a horizontal central partition of the aircraft kitchen module 1, such that the central partition forms a work surface on the upper face thereof. Furthermore, a slot-like, vertical storage compartment 16 is provided to the side of the slide-in compartments, in which storage compartment the monitor 4 can be inserted when in a non-use position. In the use position, which can be seen in FIG. 2, the monitor 4 is oriented so as to be perpendicular to the direction of flight and having the display in the direction of flight. The monitor 4 is of approximately the dimensions of a conventional computer monitor, having a screen diagonal of at least 13 inches, and is used for reproducing images of the aircraft cabin 11 recorded by the video surveillance device 5. The cabin crew member sitting on the second aircraft seat 8 arranged opposite thereto is at a distance of approximately 0.8 to 1.5 m in front of the monitor 4 and can clearly identify the images shown on said monitor, in an adequate size, owing to the size of the monitor 4. This is achieved in this case in particular by using a monitor 4 of a corresponding size, having a resolution of at least 1280×720 pixels, preferably 1920×1080 pixels.

In this case, the aircraft kitchen module 1 has been slightly reduced in size and expanded into a monument by combining it with the sanitary modules 2 and 3, with the result that the two individual toilets, previously provided, to the right and left of the central aisle 18, are omitted.

In this case, this space gained in the aircraft cabin 11 can be used for arranging one or two further rows of first aircraft seats 6, with the result that the passenger capacity of the aircraft increases. This advantage is provided in particular in the case of aircraft of the "single aisle" aircraft type, which are preferably used for short-haul flights. In the case of short-haul flights, it is not disadvantageous for the aircraft kitchen module 1 in the monument to be designed so as to be slightly smaller than conventional aircraft kitchen modules 1, since the amount of food and drinks to be served is also slightly smaller in the case of short-haul flights.

In this case, the monument is realised in the form of a wall having a smaller aircraft kitchen module 1 in the left-hand half, and two narrower sanitary modules 2 and 3 in the right-hand half. In addition to or instead of the monitor 4 provided on the aircraft kitchen module 1, monitors 4 can also be provided, instead or in addition, on the sanitary modules 2 and 3, as can be seen in FIG. 1. If a plurality of monitors 4 is provided, said monitors can be designed for reproducing the images of different cameras, and can thus show different portions of the aircraft cabin 11 in a view that is enlarged compared with the use of a single monitor 4.

The monitors 4 are preferably arranged on the aircraft kitchen module 1 or the sanitary modules 2 and 3, in the upper half of the monument, such that the cabin crew can observe said monitors in an ergonomic and expedient manner, in as horizontal a perspective as possible, when sitting upright. Furthermore, the monitor 4 can also be fixedly arranged on a slot 17 of the aircraft kitchen module 1, such that the slot 17 can be pushed into and out of the slide-in compartment, together with the monitor 4. The monitor 4 thus does not prevent use of the slot 17. If the monitor 4 is pivotably movable into a use position, the pivotability and the use position defined thereby is selected such that the monitor 4 covers a surface, in the use position, in which either no slide-in compartment is provided, or in which a slide-in compartment is provided that comprises a slot 17 used only rarely.

EMBODIMENTS

Embodiment 1. Monument for an aircraft cabin (11), characterised in that
a monitor (4) for reproducing the images recorded by a video surveillance device (5) is provided on the monument.

Embodiment 2. Monument according to embodiment 1, characterised in that
the monitor (4) is arranged so as to be transverse to the direction of flight, in a use position.

Embodiment 3. Monument according to either of the preceding embodiments, characterised in that
a second aircraft seat (8) arranged opposite the monitor (4) is provided on the monument.

Embodiment 4. Monument according to any of the preceding embodiments, characterised in that
the monitor (4) is pivotably retained on the monument.

Embodiment 5. Monument according to any of the preceding embodiments, characterised in that
a storage compartment (16) for receiving the monitor (4) is provided on the monument.

Embodiment 6. Monument according to any of the preceding embodiments, characterised in that
the monitor (4) comprises one or more optical input and output units and/or one or more acoustic input and output units and/or one or more haptic input units.

Embodiment 7. Monument according to any of the preceding embodiments, characterised in that
the monitor (4) is designed for reproducing the image of the viewer.

Embodiment 8. Monument according to any of the preceding embodiments, characterised in that
the monitor (4) has a resolution of at least 1280×720 pixels, preferably 1920×1080 pixels.

Embodiment 9. Monument according to any of the preceding embodiments, characterised in that
the monitor (4) has a screen diagonal of at least 13 inches.

Embodiment 10. Monument according to any of the preceding embodiments, characterised in that
the monument comprises an aircraft kitchen module (1), and the monitor (4) is arranged on the aircraft kitchen module (1).

Embodiment 11. Monument according to any of the preceding embodiments, characterised in that
the monument comprises at least one sanitary module (2, 3), and that the monitor (4) is arranged on the sanitary module (2, 3).

Embodiment 12. Aircraft comprising a monument according to any of embodiments 1 to 11, characterised in that
the video surveillance device (5) and the monitor (4) together form a stand-alone system that is independent of further devices.

Embodiment 13. Aircraft according to claim 12 or comprising a monument according to any of embodiments 1 to 11, characterised in that
the aircraft comprises an order system that provides for an order process personalised to the aircraft seat, and
the monitor (4) is designed for reproducing the order process personalised to the aircraft seat.

Embodiment 14. Aircraft according to either embodiment 12 or embodiment 13 or comprising a monument according to any of embodiments 1 to 11, characterised in that
the aircraft comprises a communications device personalised to the aircraft seat, and
the monitor (4) is designed for reproducing the signals transmitted by the communication device.

Embodiment 15. Aircraft according to any of embodiments 12 to 14 or comprising a monument according to any of embodiments 1 to 11, characterised in that
a second aircraft seat (8) arranged so as to be opposite the monitor (4), in the assembled position, is provided in the aircraft.

The invention claimed is:

1. A method for retrofitting a single aisle aircraft comprising an aircraft cabin, a first aircraft kitchen module, a central aisle, a plurality of first seats including a first portion of the plurality of first seats on a first side of the central aisle and a second portion of the plurality of first seats on a second side of the central aisle, at least one second seat that is a cabin assistant seat, and first and second individual toilets on the first side and the second side, respectively, of the central aisle,
the method comprising:
providing a monument that combines a second aircraft kitchen module with two sanitary modules and a video surveillance device, wherein the retrofitted aircraft has the first seats and the at least one second seat;
directing at least one camera of the video surveillance device towards the first aircraft seats;
providing a monitor on the monument for displaying images recorded by the video surveillance device; and
providing a second seat of the at least one second seat opposite the monitor, wherein the monitor is arranged on the second aircraft kitchen module or on at least one of the sanitary modules, wherein the monument is provided at a rear end of the retrofitted aircraft cabin, wherein the monument comprises the aircraft kitchen module in a first half thereof when viewed from a front of the monument and the two sanitary modules in a second half thereof when viewed from the front of the monument, wherein the video surveillance device and the monitor together form a stand-alone system that is independent of further devices, and wherein the second aircraft kitchen module in the retrofitted aircraft has been reduced in size compared to the first aircraft kitchen module and expanded to form the monument by combining it with the two sanitary modules, such that the first and second individual toilets previously provided to the first side and the second side, respectively, of the central aisle are omitted from the retrofitted aircraft, whereby a space gained in the aircraft cabin by omitting the first and second individual toilets is used for providing at least one further row of first seats compared to the aircraft before being retrofitted.

2. The method according to claim 1, wherein the monitor is pivotably retained on the monument.

3. The method according to claim 1, wherein the monument further comprises a storage compartment for receiving the monitor.

4. The method according to claim 1, wherein the monitor is configured to reproduce an image of a viewer of the monitor.

5. The method according to claim 1, wherein the monitor has a resolution of at least 1280×720 pixels of the monitor.

6. The method according to claim 1, wherein the monitor has a screen diagonal of at least 13 inches.

7. The method according to claim 1, wherein the monument is in a form of a wall comprising the aircraft kitchen module and the two sanitary modules.

8. The method according to claim 1, wherein the monitor is arranged so as to be transverse to a direction of flight, in a use position.

9. An aircraft, comprising:
an aircraft cabin;
a video surveillance device;
a monument provided at a rear end of the aircraft cabin, wherein the monument comprises a monitor for producing images recorded by the video surveillance device;
a plurality of first seats, wherein the plurality of first seats are passenger seats; and
at least one second seat, wherein the at least one second seat is a cabin assistant seat,
wherein the video surveillance device comprises one or more cameras, wherein at least one camera of the one or more cameras is directed towards one or more first seats of the plurality of first seats,
wherein one second seat of the at least one second seat is arranged opposite the monitor,
wherein the monument comprises an aircraft kitchen module in a first half thereof when viewed from a front of the monument and two sanitary modules in a second half thereof when viewed from the front of the monument, wherein the aircraft is a single aisle aircraft having a central aisle and a first portion of the plurality of first seats on a first side of the central aisle, and a second portion of the plurality of first seats on a second side of the central aisle, wherein the first portion of the plurality of first seats and the second portion of the plurality of first seats are respectively delimited by a corresponding first partition and second partition, at an end facing the monument, such that, with the exception of the central aisle, passengers sitting on the first portion of the plurality of first seats and the second portion of the plurality of first seats are visually and acoustically separated from the monument, wherein the at least one camera of the one or more cameras is provided on one of the first partition and the second partition, wherein the monitor is arranged on the aircraft kitchen module or on at least one of the sanitary modules, wherein the aircraft comprises two exits between the monument and the first and second partitions, wherein the two exits branch off to respective sides of the aircraft and each comprises an exit door, wherein each of the two exits is a normal exit or an emergency exit, and wherein the at least one second seat is foldable and is provided on at least one of the first partition and the second partition.

10. The aircraft according to claim 9, wherein the monitor is arranged so as to be transverse to a direction of flight, in a use position.

11. The aircraft according to claim 9,
wherein the aircraft further comprises an order system that provides for an order process personalised to an aircraft seat,
wherein the monitor is configured to reproduce the order process personalised to the aircraft seat,
wherein the aircraft further comprises a communications device personalised to the aircraft seat, and
wherein the monitor is configured to reproduce signals transmitted by the communication device.

12. The aircraft according to claim 9, wherein the monitor is pivotably retained on the monument.

13. The aircraft according to claim 9, wherein the monument further comprises a storage compartment for receiving the monitor.

14. The aircraft according to claim 9, wherein the monitor comprises:
one or more optical input and output units;
one or more acoustic input and output units; and/or
one or more haptic input units.

15. The aircraft according to claim 9, wherein the monitor is configured to reproduce an image of a viewer of the monitor.

16. The aircraft according to claim 9, wherein the monitor has a resolution of at least 1280×720 pixels of the monitor.

17. The aircraft according to claim 9, wherein the monitor has a screen diagonal of at least 13 inches.

18. The aircraft according to claim 9, wherein the monument is in a form of a wall comprising the aircraft kitchen module and the two sanitary modules.

* * * * *